United States Patent
Kaster

(10) Patent No.: US 11,833,996 B2
(45) Date of Patent: Dec. 5, 2023

(54) REAR DOOR WARNING SYSTEM

(71) Applicant: Robert Bosch GmbH, Stuttgart (DE)

(72) Inventor: Robert Kaster, White Lake, MI (US)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 17/237,449

(22) Filed: Apr. 22, 2021

(65) Prior Publication Data

US 2022/0340101 A1    Oct. 27, 2022

(51) Int. Cl.
*G08B 21/00* (2006.01)
*B60R 25/10* (2013.01)
*B60R 25/01* (2013.01)
*G08B 21/02* (2006.01)

(52) U.S. Cl.
CPC .......... *B60R 25/1012* (2013.01); *B60R 25/01* (2013.01); *G08B 21/02* (2013.01)

(58) Field of Classification Search
CPC ...... B60R 25/1012; B60R 25/01; G08B 21/02
USPC ......................................................... 340/457
See application file for complete search history.

(56) References Cited

U.S. PATENT DOCUMENTS

| | | | |
|---|---|---|---|
| 7,686,378 B2 | 3/2010 | Gisler et al. | |
| 8,111,146 B2 | 2/2012 | Touge | |
| 9,834,978 B2 | 12/2017 | Nania | |
| 10,161,566 B2 | 12/2018 | Voong et al. | |
| 2008/0296926 A1* | 12/2008 | Hanzel | H03K 17/941 704/251 |
| 2009/0243826 A1* | 10/2009 | Touge | B60Q 9/00 340/436 |
| 2015/0009062 A1* | 1/2015 | Herthan | G01S 7/415 342/70 |
| 2017/0327079 A1* | 11/2017 | Grossmann | B60R 25/01 |
| 2018/0118106 A1* | 5/2018 | You | G06V 40/103 |
| 2018/0163454 A1* | 6/2018 | Motoki | E05F 15/655 |
| 2019/0112858 A1 | 4/2019 | Partsch et al. | |
| 2020/0291706 A1* | 9/2020 | Kimura | E05F 15/40 |
| 2020/0362603 A1* | 11/2020 | Aitharaju | B60J 5/0415 |
| 2021/0362678 A1* | 11/2021 | Jin | B60R 25/01 |

* cited by examiner

*Primary Examiner* — Mark S Rushing
(74) *Attorney, Agent, or Firm* — Maginot, Moore & Beck LLP

(57) ABSTRACT

A vehicle includes a rear door, at least one sensor component proximate to the rear door, an alert system, a memory in which program instructions are stored, and a processor operably connected to the alert system, the at least one sensor component, and the memory. The processor executes the program instructions to detect an object within a detection zone of the at least one sensor component relative to the rear door. The processor further activates the alert system in response to the object being within a predefined protection zone of the detection zone when the rear door is not moving.

16 Claims, 3 Drawing Sheets

REAR DOOR WARNING SYSTEM

FIELD

This disclosure relates to a warning system for vehicles with rear doors.

BACKGROUND

Many vehicles such as hatchbacks include a rear door to provide access to cargo areas in the rear of the vehicle. In other vehicles, the rear door is in the form of a trunk lid. Many vehicles with rear doors are provided with door opening assist devices. The door opening assist devices include hydraulic struts, springs, etc. In some systems, the door opening assist devices incorporate actuators which are activated using, by way of example, a sensor associated with a rear bumper, a switch on a key fob, a switch inside of a vehicle, etc. In any event, the door opening assist devices offer the benefit of ease in opening and, in some instances, closing the rear door.

In many instances, an individual stops looking at the rear door as it is opening, and begins to bend down to insert or remove cargo when they believe that continued opening of the rear door will provide sufficient clearance to avoid hitting their head on the rear door, particularly in systems with door opening assist systems. In some instances, however, the door opening assist devices do not function as designed, and do not fully open. In these circumstances, the rear door may stop short of the design opening location. Consequently, individuals frequently bump their heads on rear doors which have failed to fully open.

Additionally, even when a rear door is fully opened, the bottom of the opened rear door does not provide sufficient height to be clear of the heads of some individuals. This is particularly concerning for individuals in the range of about six feet two inches to six feet five inches. For individuals of this height, fully opened rear doors are above the individual's typical line of sight, but not sufficiently high enough to provide the necessary clearance for the individual's head as they bend toward the cargo compartment.

What is needed therefore is a system and method which provides warning to individuals in the event that the individual's head may contact a rear door. It would be beneficial if the system and method provided a warning even when the rear door is not fully opened.

SUMMARY

In one embodiment, a vehicle includes a rear door, at least one sensor component proximate to the rear door, an alert system, a memory in which program instructions are stored, and a processor operably connected to the alert system, the at least one sensor component, and the memory. The processor executes the program instructions to detect an object within a detection zone of the at least one sensor component relative to the rear door. The processor further activates the alert system in response to the object being within a predefined protection zone of the detection zone when the rear door is not moving.

In one or more embodiments, the at least one sensor component includes an ultrasonic sensor.

In one or more embodiments, the predefined protection zone is commensurate with the detection zone.

In one or more embodiments, the at least one sensor component includes a capacitive sensing chip configured to generate a signal that is transmitted from a first component in the rear door, and a plurality of receivers arranged in a plurality of predefined positions in the rear door that are separate from the first component and configured to detect the transmitted signal.

In one or more embodiments, the processor is further configured to execute the program instructions to establish a first location of the object at a first time based upon a first set of relative signal strength levels detected by the at least one sensor component, establish a second location of object at a second time based upon a second set of relative signal strength levels detected by the at least one sensor component, and determine at least one of a speed and direction of movement of the object based on the first location, the second location, and a difference between the first time and the second time. The processor is further configured to execute the program instructions to activate the alert system in response to determining that an unsafe condition exists based upon at least one of the speed and direction of movement of the object.

In one or more embodiments, the object is determined by the processor to be a part of an individual.

In one or more embodiments, the processor is configured to define the protection zone based upon at least one of the speed and direction of movement of the object.

In one or more embodiments, the processor is configured to execute the program instructions to define the protection zone based upon a determined position of the rear door.

In one or more embodiments, the at least one sensor component includes at least one first sensor component positioned at a lower portion of the rear door, at least one second sensor component positioned at a left side portion of the rear door, and at least one third sensor component positioned at a right side portion of the rear door.

In one or more embodiments, the processor is configured to execute the program instructions to define the protection zone based upon a determined position of the rear door.

In accordance with one method, operating a vehicle warning system includes detecting an object within a detection zone of at least one sensor component positioned proximate to a rear door of a vehicle using a processor executing program instructions stored in a memory, and activating with the processor an alert system in response to the object being within a predefined protection zone of the detection zone when the rear door is not moving.

In one or more methods, detecting the object includes detecting the object using an ultrasonic sensor of the alert system.

In one or more methods the predefined protection zone is commensurate with the detection zone.

In one or more methods detecting the object includes generating a signal with a capacitive sensing chip of the at least one sensor component, transmitting the generated signal, and detecting the transmitted signal with a plurality of receivers of the at least one sensor component arranged in a plurality of predefined positions in the rear door that are separate from the capacitive sensing chip.

In one or more embodiments the method includes establishing with the processor a first location of the object at a first time based upon a first set of relative signal strength levels detected by the at least one sensor component, establishing with the processor a second location of object at a second time based upon a second set of relative signal strength levels detected by the at least one sensor component, and determining with the processor at least one of a speed and direction of movement of the object based on the first location, the second location, and a difference between the first time and the second time. In one or more of these methods activating with the processor the alert system further includes activating the alert system in response to determining that an unsafe condition exists based upon at least one of the speed and direction of movement of the object.

In one or more embodiments the method includes determining with the processor that the object is a part of an individual.

In one or more embodiments the method includes defining the protection zone based upon at least one of the speed and direction of movement of the object.

In one or more embodiments the method includes defining the protection zone based upon a determined position of the rear door.

In one or more methods detecting the object within the detection zone of the at least one sensor component includes detecting the object with one or more of a first sensor component of the at least one sensor component positioned at a lower portion of the rear door, a second sensor component of the at least one sensor component positioned at a left side of the rear door, and a third sensor component of the at least one sensor component positioned at a right side of the rear door.

In one or more embodiments the method includes defining the predefined protection zone based upon a position of the rear door determined by the processor.

DESCRIPTION

Figure 1:
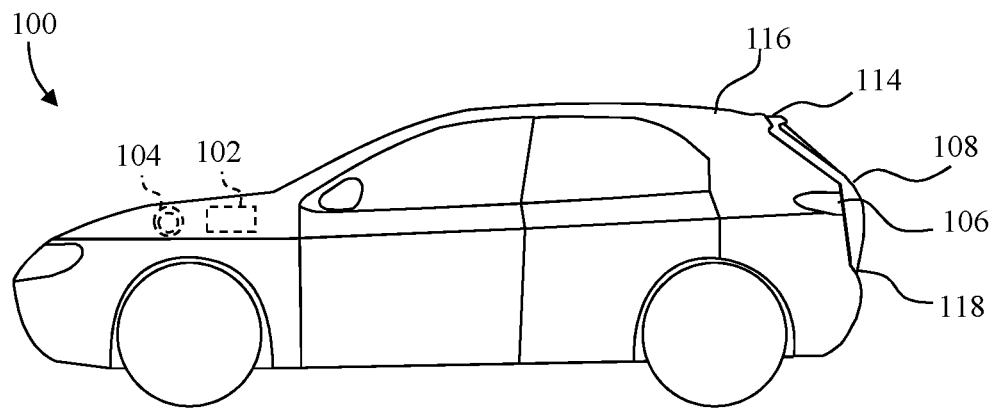
FIG. 1 depicts a side plan view of a vehicle with a rear door incorporating a warning system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Figure 2:
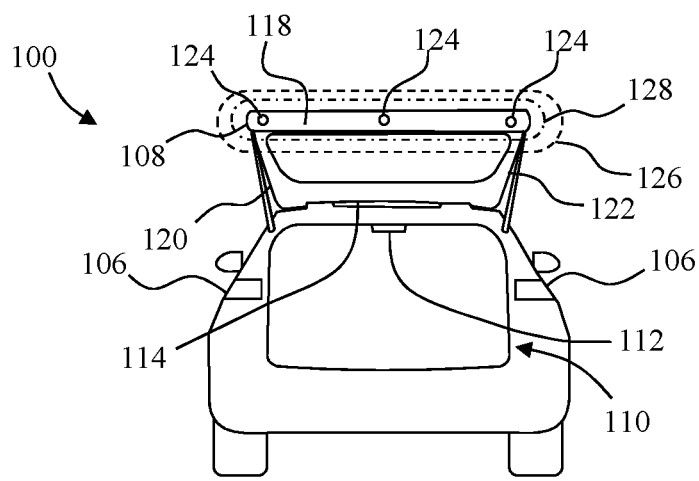
FIG. 2 depicts a rear plan view of the vehicle of FIG. 1 with the rear door open.

FIG. 1 depicts a vehicle 100 that includes a processor 102, a horn 104, and rear lights 106. The vehicle 100 further includes a rear door 108 that when open, as shown in FIG. 2, provides access to a cargo area 110. An interior light 112 is provided within the vehicle.

Figure 3:
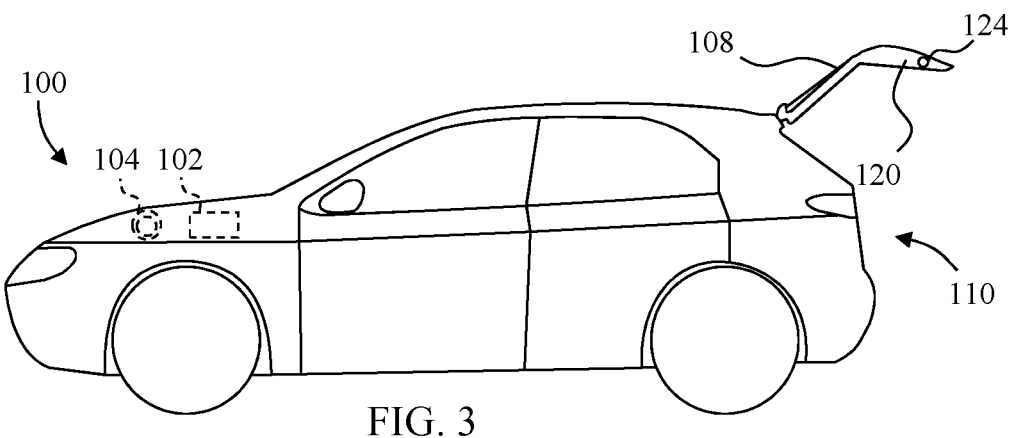
FIG. 3 depicts a side plan view of the vehicle of FIG. 1 with the rear door open.

The rear door 108 includes a top portion 114 which is hingedly connected to a body 116 of the vehicle 100, a bottom portion 118, and two side portions 120 and 122. At least one sensor component 124 is associated with the rear door 108. In the embodiment of FIGS. 2-3, three sensor components 124 are provided at the bottom portion 118 of the rear door 108. Additional sensor components 124 are provided in the left and right side portions 120/122 (only the sensor component 124 in side portion 120 is shown in FIG. 3).

The sensor components 124 are used to define a detection zone 126 in the area of the bottom portion 118 of the rear door 108. A protection zone 128 is further defined within, or commensurate with, the detection zone 126. In embodiments with a single sensor component 124, the sensor component 124 is typically provided in a central location of the bottom portion 118. By providing more than one sensor component 124, however, a shaped detection zone 126 is defined which more closely tracks the shape of the bottom portion 118 and/or side portions 120/122.

Figure 4:
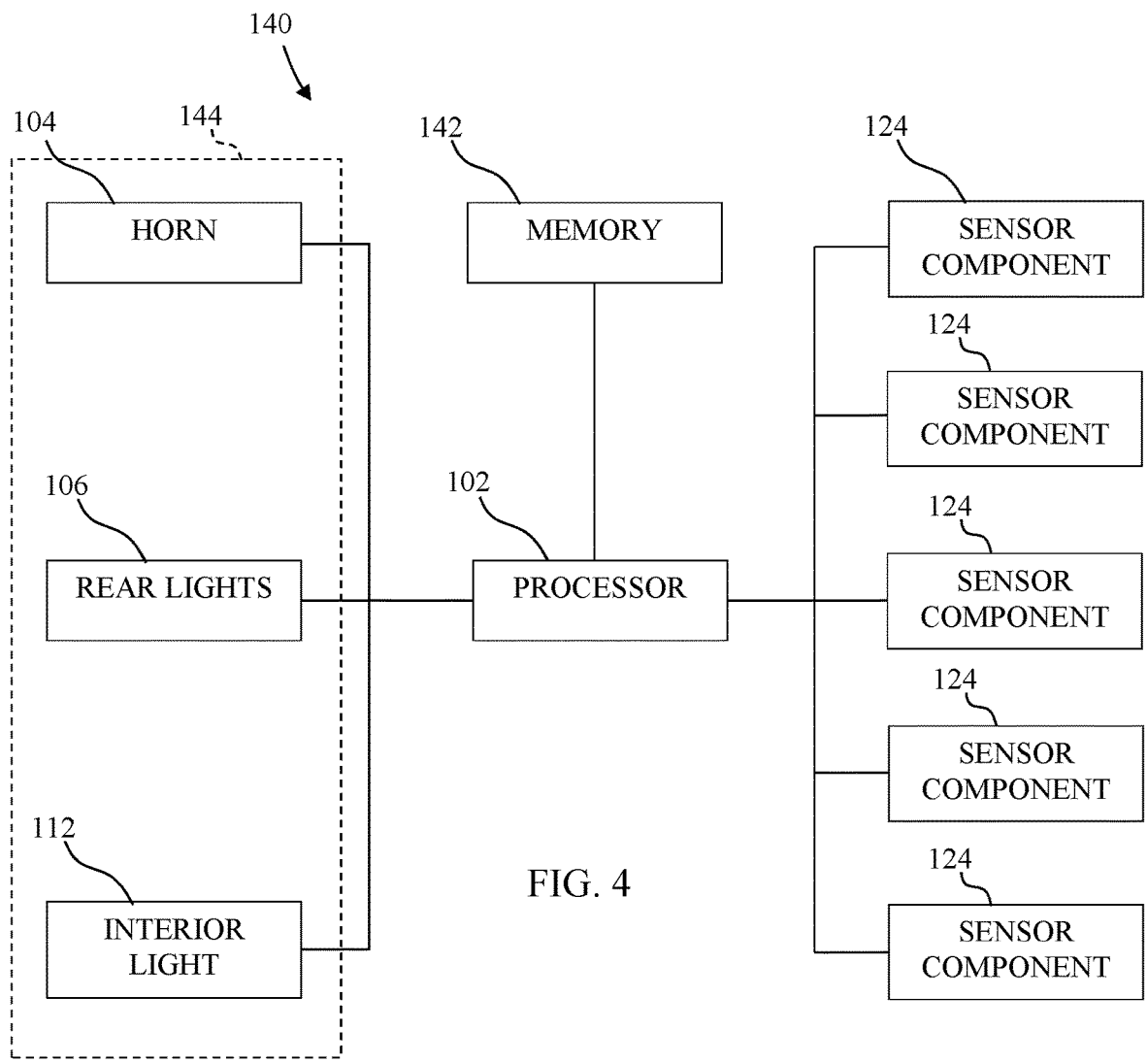
FIG. 4 depicts the warning system of the vehicle of FIG. 1.

FIG. 4 shows a warning system 140 that is used to sense unsafe conditions and control various components of the vehicle 100 in response to such conditions. The warning system 140 includes the processor 102 which is operably connected to a memory 142, the horn 104, the rear lights 106, the interior light(s) 112, and one or more sensor components 124. The operable connections shown in FIG. 4 in some embodiments are wired, wireless, and combinations of wired and wireless. One or more of the horn 104, the rear lights 106, and the interior light(s) 112 form an alert system 144 for the warning system 140.

The processor 102 is implemented as desired such as with one or more general or specialized programmable processors that execute programmed instructions which are stored in the memory 142 as discussed in further detail below. The processor 102, memory 142, and interface circuitry is provided in some embodiments on a printed circuit card or provided as a circuit in an application specific integrated circuit (ASIC). Each of the circuits is implemented in some embodiments with a separate processor or multiple circuits implemented on the same processor. In further embodiments, the circuits are implemented with discrete components or circuits provided in VLSI circuits. The circuits described herein are implemented in some embodiments with a combination of processors, ASICs, discrete components, or VLSI circuits.

The one or more sensor components 124 are provided in the form of radars, ultrasonic sensors, camera systems, near and far infrared, ultrasonic, LIDAR sensors, range-image cameras, capacitive sensors, as well as a combination of these sensors in different embodiments. While five sensor components 124 are shown in FIG. 4, in some embodiments fewer sensor components are used and in other embodiments more are used.

In some embodiments the sensor components 124 are identical, while in other embodiments the sensor components are differently formed. By way of example, in one embodiment one or more sensor component 124 is provided in the form of a capacitive or capacitive proximity sensor which is driven by one or more proximity sensing chips (self-capacitance or mutual capacitance) such as those from Silicon Labs (C8051F7xx, C8051F8xx, C8051F9xx, and similar chips not listed), Microchip (GestIC, all the general purpose mTouch MCUs, and similar chips not listed), Atmel (QTouch/QTouchADC, QMatrix, and similar chips not listed), or another similar chip. The capacitive sensing chip in some embodiments is a mutual capacitance configuration. Accordingly, the capacitive sensing chip is configured such that a signal is on a portion of the rear door 108 electrically isolated from the rest of the rear door 108, which allows a portion of the rear door 108 to act as a transmitter. Others of the sensor components 124 are then provided as receivers.

In some embodiments, proximity sensing is integrated into processors such as ARM-based architecture processors or any other desired form. In some embodiments, more than one microcontroller is used to drive one or more capacitive proximity sensing chips. In some embodiments, one or more microcontroller(s) drive a combination of capacitive proximity sensing chip(s) and other sensing systems (e.g. NIR, UWB, IR, etc.). In some embodiments, one or more microcontroller(s) drive a combination of ARM-based processors and other sensing systems (e.g. NIR, UWB, IR, etc.).

Figure 6:
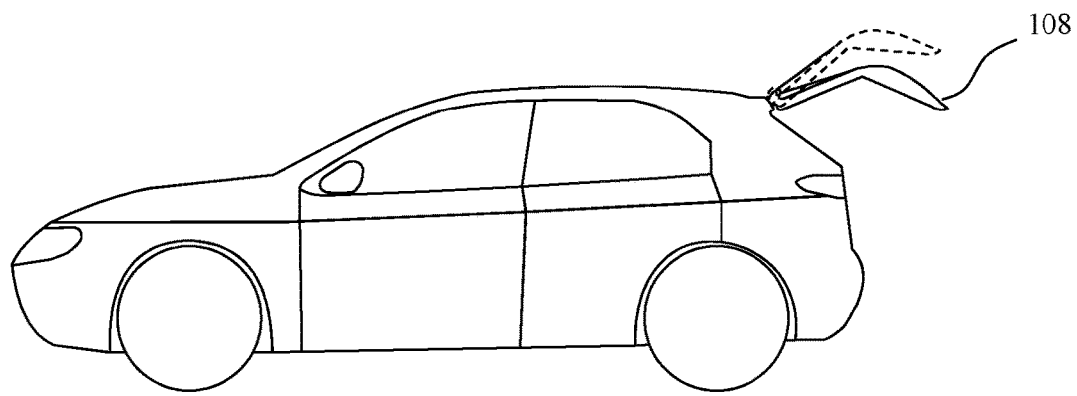
FIG. 6 depicts the vehicle of FIG. 1 with the rear door partially opened.
Figure 5:
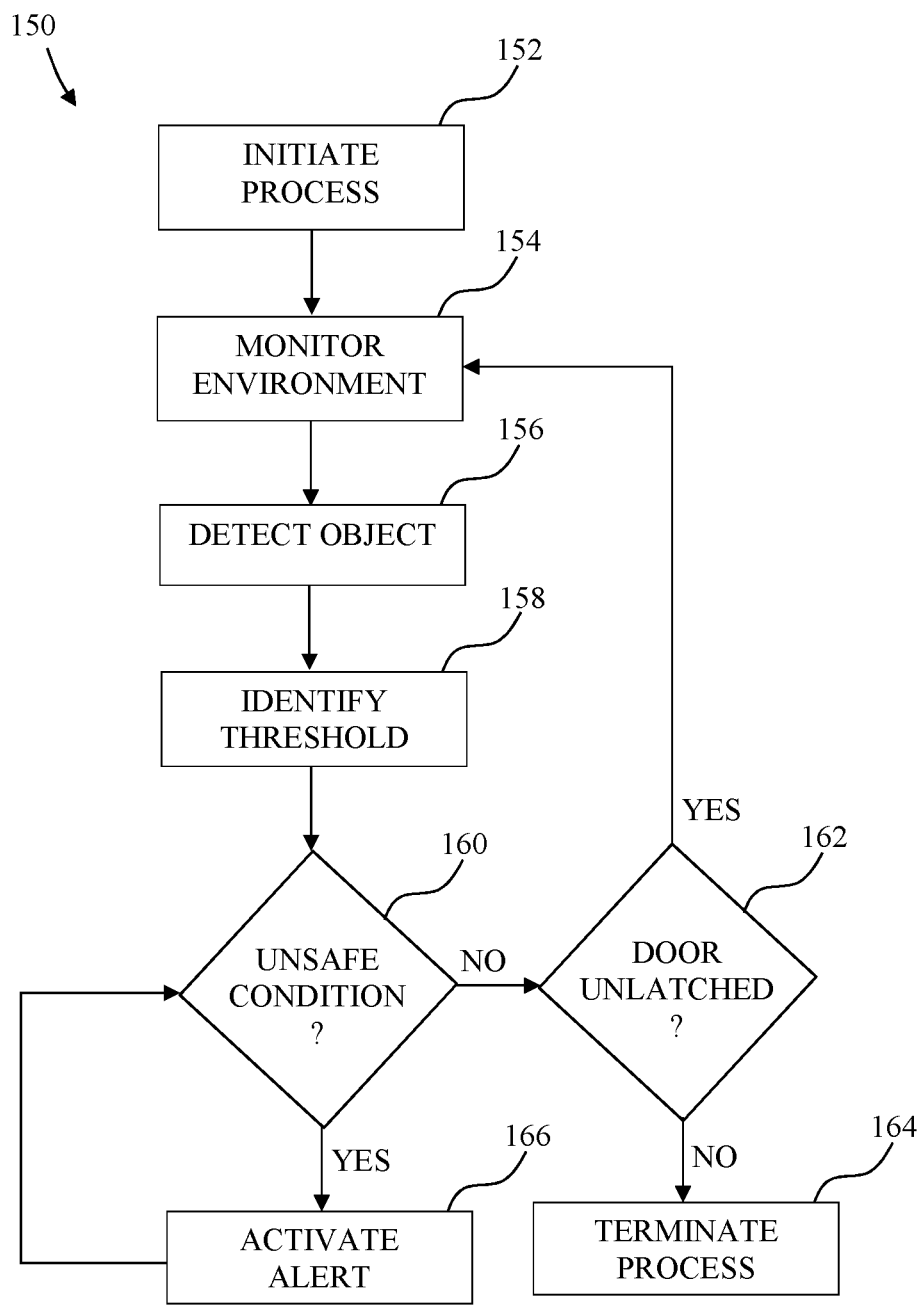
FIG. 5 depicts a process executed by the processor of the warning system of FIG. 4 which alerts an individual of a potential contact with the rear door of the vehicle.

Operation of the warning system 140 is described with further reference to FIG. 5. When the processor 102 determines that criteria for executing the process 150 have been met, the processor 102 executes program instructions stored in the memory 142 to perform the process 150 of FIG. 5. At block 152, the process 150 is initiated. Various criteria for initiation of the process 150 are used in different embodiments. In some embodiments, the criteria require only that the rear door 108 is unlatched. This allows for monitoring while the rear door 108 is moving. In other embodiments, the criteria further require that the rear door 108 is unlatched and not moving. Thus, even when the rear door 108 is stopped at a location short of its fully open position as shown in FIG. 6, the criteria is met. In some embodiments the criteria requires the rear door 108 to be at its fully open position depicted in phantom in FIG. 6. Additional sensors such as magnetic sensors and motion detectors are incorporated into the sensor components 124 as desired to allow the desired initiation criteria. Moreover, additional sensors may be used in surrounding components such as the struts and bumper if desired.

When the process 150 is initiated, the sensor components are used to monitor the environment of the rear door 108 at block 154. At block 156 the sensor components 124 are used to detect an object, which may be an individual, within the detection zone. At block 158 a threshold for the detected object is identified. The threshold is associated with a signal indicating detection of the object. In some embodiments the threshold for the identified object is a stored value in the memory 142 which is used for all situations. This configuration is particularly useful when the detection zone 126 and the protections zone 128 are commensurate.

In some embodiments, the thresholds are varied dependent upon the particular location of the rear door 108. By way of example, in some embodiments a small detection zone (high threshold) is used when the rear door is proximate a fully closed position, and a larger (low threshold) is used when the rear door is proximate a fully open position.

In some embodiments, the processor is configured to track objects within the protection zone 128 using data associate with the detected object. In particular, by analyzing the signals from the sensor components 124, the specific location of an object within the detection zone can be determined. Likewise, the processor can determine if the object is part of an individual in embodiments using capacitive sensors, for example. In some such embodiments, the processor 102 is configured to only track objects which are determined to be a part of an individual.

Consequently, by storing a desired algorithm in the memory 142, the output of the sensor components 124 is analyzed to ascertain a position, speed, and direction of movement of the detected object relative to the location of the rear door 108. The speed and direction of movement relative to the actual position of the rear door 108 is used by the processor 102 in some embodiments to define the dimensions of the protection zone 128 (e.g., to define the threshold(s) to be used in ensuing steps). For example, for an object moving at slow speed a smaller protection zone is required to provide an alert in sufficient time for an individual to avoid contacting the rear door 108. Likewise, an object moving parallel to the rear door 108 requires a smaller protection zone compared to an object moving directly toward the rear door 108. Accordingly, the processor predefines the protection zone and/or the detection zone for a particular detected object and stores the associated threshold values for signals from the sensor components at block 158.

Thus, by selecting the desired location and configuration of the components in the warning system 140, the warning system can be configured to define a protection zone with a desired shape and sensitivity. The warning system 140 thus provides spatial recognition which, using a spatial recognition algorithm stored in the memory 142, is able to identify an unsafe condition based upon the determined location of the object with reference to the rear door 108 and the speed of movement of the object. The "threshold" is thus the boundary of the three dimensional protection zone, the shape of which in some embodiments reflects the relative danger of a particular location with respect to the movement of the object.

At block 160 the processor 102 determines when an unsafe condition exists. An "unsafe" condition exists when signals from the sensor components singly or jointly exceed the predefined threshold stored in the memory 142 which in some embodiments is predefined at block 158.

When at block 160 no unsafe condition exists, the process 150 continues to block 162 and determines if continued monitoring is required. Thus, for example, in some embodiments when the rear door 108 is latched at the block 162 the process 150 is terminated at block 164. Termination of the process 150 does not necessarily result in a deactivation of all or some of the components in the warning system 140. For example the processor 102 in some embodiments is used in other circuits.

Returning to block 162, if the criteria for executing the process 150 are still met at block 162, then the process continues to block 154 and the environment is again monitored.

When at block 160 an unsafe condition is determined to exist due to exceeding predefined threshold(s) stored in the memory 142, the process continues to block 166 and an alert is activated. The alert in some embodiments includes one or more of sounding the horn 104, flashing the rear lights 106, and flashing the interior light 112. The process then returns to block 160 to check if the unsafe condition still exists.

The process 150 in different embodiments is modified within the scope of the disclosure. By way of example, in some embodiments an alert is activated when an object is detected within the detection zone 126, with the alert intensifying as the object enters the protection zone. Intensifying of the alert in various embodiments includes intensity of the horn, frequency of horn/light activation, etc. In some embodiments, the process includes deactivating the alert once contact is made with the rear door 108. Thus an individual using a hand to move the door receives the initial alert, but the alert does not continue the entire time that the individual is contacting the rear door 108.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A vehicle, comprising:
   a rear door;

at least one sensor component proximate to the rear door;
an alert system;
a memory in which program instructions are stored; and
a processor operably connected to the alert system, the at least one sensor component, and the memory, the processor configured to execute the program instructions to
  detect an object within a detection zone of the at least one sensor component relative to the rear door,
  activate the alert system in response to the object being within a predefined protection zone of the detection zone when the rear door is not moving and unlatched,
  establish a first location of the object at a first time based upon a first set of relative signal strength levels detected by the at least one sensor component;
  establish a second location of object at a second time based upon a second set of relative signal strength levels detected by the at least one sensor component; and
  determine at least one of a speed and direction of movement of the object based on the first location, the second location, and a difference between the first time and the second time, wherein the processor is further configured to
  execute the program instructions to activate the alert system in response to determining that an unsafe condition exists based upon at least one of the speed and direction of movement of the object, and
  define the predefined protection zone based upon at least one of the speed and direction of movement of the object.

2. The vehicle of claim 1, wherein;
the processor is configured to determine that the object is within the predefined protection zone using the at least one sensor component; and
the at least one sensor component includes an ultrasonic sensor.

3. The vehicle of claim 1, wherein the predefined protection zone is commensurate with the detection zone.

4. The vehicle of claim 1, the at least one sensor component comprising:
  a capacitive sensing chip configured to generate a signal that is transmitted from a first component in the rear door; and
  a plurality of receivers arranged in a plurality of predefined positions in the rear door that are separate from the first component and configured to detect the transmitted signal.

5. The vehicle of claim 1, wherein the object is determined by the processor to be a part of an individual.

6. The vehicle of claim 1, wherein the processor is configured to execute the program instructions to:
  define the predefined protection zone based upon a determined position of the rear door.

7. The vehicle of claim 1, wherein the at least one sensor component comprises:
  at least one first sensor component positioned at a lower portion of the rear door;
  at least one second sensor component positioned at a left side portion of the rear door; and
  at least one third sensor component positioned at a right side portion of the rear door.

8. The vehicle of claim 7, wherein the processor is configured to execute the program instructions to:
  define the predefined protection zone based upon a determined position of the rear door.

9. A method of operating a vehicle warning system, comprising:
  detecting an object within a detection zone of at least one sensor component positioned proximate to a rear door of a vehicle using a processor executing program instructions stored in a memory;
  activating with the processor an alert system in response to the object being within a predefined protection zone of the detection zone when the rear door is not moving and not latched,
  establishing with the processor a first location of the object at a first time based upon a first set of relative signal strength levels detected by the at least one sensor component;
  establishing with the processor a second location of object at a second time based upon a second set of relative signal strength levels detected by the at least one sensor component; and
  determining with the processor at least one of a speed and direction of movement of the object based on the first location, the second location, and a difference between the first time and the second time, wherein
  activating with the processor the alert system further comprises activating the alert system in response to determining that an unsafe condition exists based upon at least one of the speed and direction of movement of the object, and
  the method further comprises defining the predefined protection zone based upon at least one of the speed and direction of movement of the object.

10. The method of claim 9, wherein:
the at least one sensor component comprises an ultrasonic sensor; and
activating with the processor the alert system comprises activating with the processor the alert system based upon determining that the object is within the predefined protection zone using the ultrasonic sensor of the alert system.

11. The method of claim 9, wherein the predefined protection zone is commensurate with the detection zone.

12. The method of claim 9, wherein detecting the object comprises:
  generating a signal with a capacitive sensing chip of the at least one sensor component;
  transmitting the generated signal; and
  detecting the transmitted signal with a plurality of receivers of the at least one sensor component arranged in a plurality of predefined positions in the rear door that are separate from the capacitive sensing chip.

13. The method of claim 9, further comprising:
  determining with the processor that the object is a part of an individual.

14. The method of claim 9, further comprising:
  defining the predefined protection zone based upon a determined position of the rear door.

15. The method of claim 9, wherein detecting the object within the detection zone of the at least one sensor component comprises:
  detecting the object with one or more of
    a first sensor component of the at least one sensor component positioned at a lower portion of the rear door,
    a second sensor component of the at least one sensor component positioned at a left side of the rear door, and
    a third sensor component of the at least one sensor component positioned at a right side of the rear door.

16. The method of claim 15, further comprising:
defining the predefined protection zone based upon a position of the rear door determined by the processor.

\* \* \* \* \*